United States Patent
Brock et al.

(10) Patent No.: US 6,886,106 B2
(45) Date of Patent: Apr. 26, 2005

(54) SYSTEM AND METHOD FOR CONTROLLING A MULTIPLEXER FOR SELECTING BETWEEN AN INPUT CLOCK AND AN INPUT DUTY-CYCLE-CORRECTED CLOCK AND OUTPUTTING THE SELECTED CLOCK AND AN ENABLE SIGNAL

(75) Inventors: Bishop Chapman Brock, Coupland, TX (US); Gary Dale Carpenter, Pflugerville, TX (US); Amanda Christine Caswell, Austin, TX (US); Eric William MacDonald, Cedar Park, TX (US); Timothy Joe Rubidoux, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 09/978,358

(22) Filed: Oct. 16, 2001

(65) Prior Publication Data

US 2003/0074595 A1 Apr. 17, 2003

(51) Int. Cl.[7] .............................. G06F 1/04; G06F 1/32; H03K 3/017
(52) U.S. Cl. ........................ 713/500; 713/322; 327/175
(58) Field of Search ................................. 713/300, 500; 327/175

(56) References Cited

U.S. PATENT DOCUMENTS

| | | | | |
|---|---|---|---|---|
| 6,515,530 | B1 | * | 2/2003 | Boerstler et al. ........... 327/291 |
| 6,566,918 | B1 | * | 5/2003 | Nguyen ...................... 327/115 |
| 6,639,441 | B1 | * | 10/2003 | Ono et al. .................. 327/175 |
| 6,781,419 | B1 | * | 8/2004 | Harrison ..................... 326/95 |

OTHER PUBLICATIONS

Nelson Victor P. et al., Digital Logic Circuit Analysis and Design, 1995, Prentice–Hall Inc., pp. 268–277.*

* cited by examiner

Primary Examiner—Dennis M. Butler
(74) Attorney, Agent, or Firm—Carr LLP; Robert M. Carwell

(57) ABSTRACT

A method and apparatus for providing a dynamically alterable output clock from an input clock based on the value of an integer, where the integer can be modified continuously. The invention also provides a sample cycle output which is an enable pulse, having the width of the input clock cycle, that is asserted one or two input clock cycles prior to the rising edge alignment of the input and output clocks, that acts as a rising edge alignment enable signal, maintaining a one-to-one correspondence between the sample cycle assertions and rising edge alignment events, regardless of the dynamic changes in the value of the integer.

20 Claims, 5 Drawing Sheets

SYSTEM AND METHOD FOR CONTROLLING A MULTIPLEXER FOR SELECTING BETWEEN AN INPUT CLOCK AND AN INPUT DUTY-CYCLE-CORRECTED CLOCK AND OUTPUTTING THE SELECTED CLOCK AND AN ENABLE SIGNAL

BACKGROUND

The advent of ever more powerful computer systems has resulted in a continuing search for ways to reduce power consumption and increase performance in the systems.

Dynamic power consumption and performance are directly proportional to the frequency of the clock in complimentary metal oxide semiconductor (CMOS) circuits. In low power/high performance applications, there exists a necessary trade off between power and performance. Traditionally, a single clock frequency is chosen for a particular application, which determines the specific power/performance ratio for that application. Typically, the ratio is balanced in favor of performance.

Clocks are periodic signals used for timing and synchronization in synchronous digital circuits. The clock frequency defines the period of time in which logic operations are performed. Logic operations in electronic circuits proceed through a series, or path, of logic gates. The results of different paths of logic operations are generally converged with the results of other paths of logic operations. The results of different paths must be converged at a time when all of the paths have completed processing data through the logic gates and have a result. Because different logic paths do not process data in the same amount of time, those logic paths that finish processing first must hold the result of their logic operations until all the logic paths are to converge have completed processing.

Clocks are used in digital processors to synchronize the holding of logic operation results until all logic paths have completed processing. The time it takes for all logic paths that are to be converged to finish processing is defined as a clock cycle. When all the data from all the logic paths has been converged, the logic paths can then be used to process the next pieces of data. A clock event generates a rising, or source clock edge that typically initiates the start of processing new data through the logic paths. A second clock event follows the clock event that generated the rising clock edge that generates a destination, or falling clock edge. The values in all the logic paths are sampled at the destination clock edge to determine if new values have been processed that can be converged. Each microprocessor only has a limited amount of capacity, so any time and power used to operate clocks to perform their regulating function is time and power that cannot be used to perform processing functions. It is therefore desirable that clocks perform their function as efficiently as possible. Traditionally, a single clock frequency is chosen for a particular application that will enable the clocks to function efficiently while minimizing the impact on performance.

A continuing search has been directed to the development of a method and apparatus that will enable the operating system to dynamically change the clock frequency. By enabling the system to fine-tune the clock speed based on load requirements of the system, the overall energy requirements can be minimized while system performance is optimized.

SUMMARY

The present invention, accordingly, provides a synthesizable (technology-independent) logic design that provides a dynamically alterable output clock value generated from an input clock value, and a sample cycle output that acts as a rising edge alignment enable signal, maintaining a one-to-one correspondence between the sample cycle assertions and rising edge alignment events, regardless of the dynamic changes in the value of the integer.

The invention comprises a dynamically alterable clock that includes determining if an integer value generated by a microprocessor is 1, and if so, sending an input parent clock value to a glitchless clock and sample cycle multiplexer for outputting as an output clock value and sending a signal to the glitchless clock and sample cycle multiplexer to output a high signal value as a sample cycle output. If the integer value is greater than 1, generating a duty-cycle-corrected clock signal from the input parent clock value that has been divided, and sending the duty-cycle-corrected clock signal to the glitchless clock and sample cycle multiplexer for outputting as an output clock value, and generating and sending a sample cycle signal to the glitchless clock and sample cycle multiplexer for outputting as a sample cycle value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
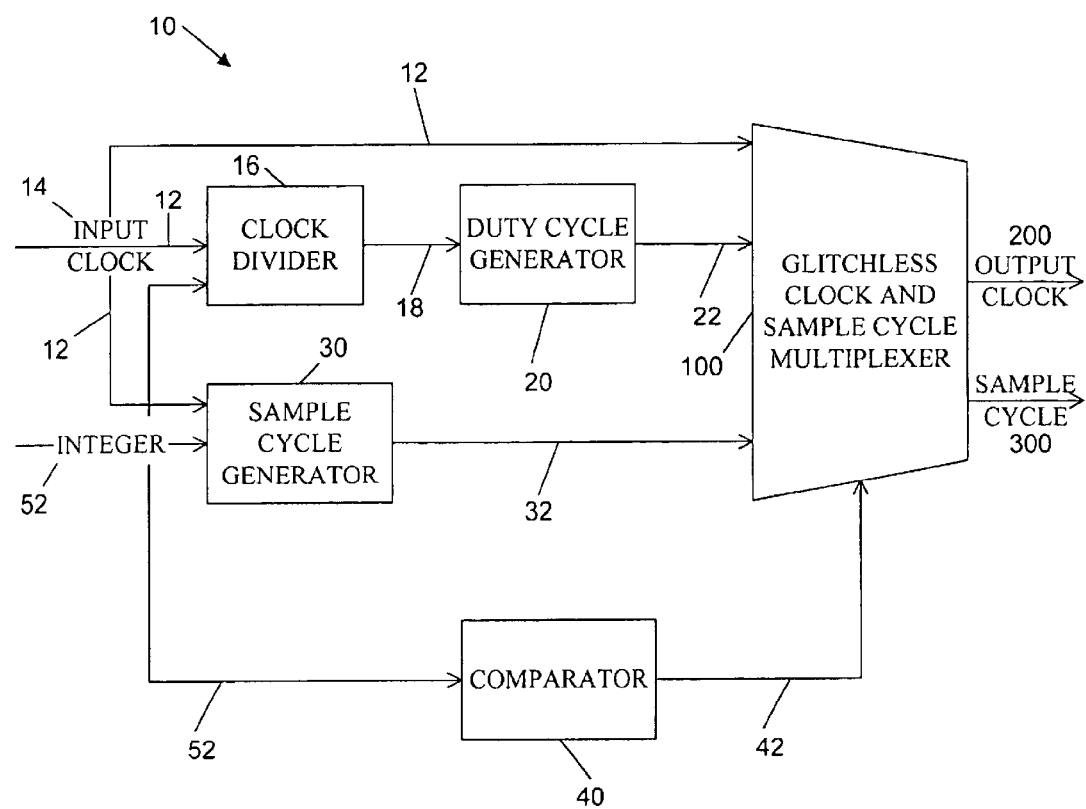
FIG. 1 is a top-level block diagram of the dynamic clock generation feature of the present invention.

In the discussion of the FIGURES, the same reference numerals will be used throughout to refer to the same or similar components. In the interest of conciseness, various other components known to the art, such as computer components, computer code, power sources, and the like necessary for the operation of the microprocessor utilizing the dynamic clock, have not been shown or discussed.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. It is further noted that, unless indicated otherwise, all functions described herein are performed by a processor such as a computer or electronic data processor in accordance with code such as computer program code, software, or integrated circuits that are coded to perform such functions. Additionally, for the most part, details not considered necessary to obtain a complete understanding of the present invention have been omitted, and are considered to be within the skills of persons of ordinary skill in the relevant art.

Referring to FIG. 1 of the drawings, a preferred embodiment of a dynamic clock generator in accordance with the present invention is shown. The software code used to implement this embodiment of the present invention is captured in a high-level hardware description language (HDL), and as such can be synthesized for any CMOS technology. The reference numeral 10 generally refers to a preferred embodiment of a synthesizable dynamic clock embodying features of the present invention. A signal from an output clock 200 having a 50% duty cycle and a sample cycle 300 are the outputs from the system. An input value 12 from an input parent clock 14 having a 50% duty cycle, and an integer 52, typically having a value of from 1 to 32, are the inputs to the system. The value of the integer 52 can change dynamically at any time and is asynchoronous relative to the input clock. The value of the integer 52 is typically stored in a register in the microprocessor.

The input value 12 from the input parent clock 14 and the integer 52, having a value of from 1 to 32 are provided to the clock divider 16. When the value of the integer 52 is greater than 1, the clock divider 16 divides the input value 12 and generates a clock divider output value 18.

The ability to cleanly modify the frequency of the output value 18 of a clock divider 16 poses a number of problems. Clock glitches, such as clock skew and clock jitter, out-of-range intermediate frequencies, and interactions between different clock domains while one or more of the domains is changing frequencies are some of the issues encountered when implementing dynamic clock generation. Intermediate frequency problems can arise if the integer value is changed during a clock cycle. To resolve this problem, in the present invention, the value of the integer 52 does not change until the end of the clock cycle, eliminating intermediate frequency problems. Clock skew is the difference in arrival times of the clock edges of different inputs. Even though the inputs are based on the same master clock, the information is processed through different clock domains, and the arrival times in the different domains can become skewed slightly from each other due to a number of factors. Clock jitter is a variation in arrival time of a clock event in a single clock domain. The actual arrival time of a specific event may differ slightly from the projected, or ideal arrival time. Varying types of noise in the system that occur at different times and different places are a primary cause of clock jitter. To resolve these problems, in the present invention, the output value 18 from the clock divider is processed through a duty-cycle corrector 20.

A clock with a 50% duty cycle provides an equal amount of time for rising edge and falling edge portions of a clock cycle. A clock with a 50% duty cycle is in each portion of the clock cycle for about the same amount of time. A clock with a different duty cycle allocates different percentages of the clock cycle time for rising edge and falling edge portions of the cycle, and the clock is in one portion of the cycle longer than the other portion of the cycle. The frequency at which a circuit can operate may be limited based on the time the clock is in a particular portion of the cycle. This can result in a circuit operating at less than optimal frequency. Thus, it is desirable to ensure that all the clocks in the system have a 50% duty cycle. This is especially true in the present system, where the value of the integer 52 can be modified while the system is operating, making it difficult to maintain cycle correspondence between the input value 12 from the input parent clock 14 and the output value 18 from the clock divider 16 fed to the glitchless clock and sample cycle multiplexer 100.

To that end, the clock divider output value 18 is processed through the duty-cycle corrector 20 to produce a duty-cycle-corrected output 22 having a 50% duty cycle. The duty-cycle-corrected output 22 is fed into the glitchless clock and sample cycle multiplexer 100.

The input value 12 from the input parent clock 14 is input to the glitchless clock and sample cycle multiplexer 100. The integer 52 is input to a comparator 40. If the value of the integer 52 is equal to 1, the comparator sends a bypass signal 42 to the glitchless clock and sample cycle multiplexer 100. When the glitchless clock and sample cycle multiplexer 100 receives this bypass signal 42 from the comparator, it outputs the input value 12 it has received from the input parent clock 14 as the output clock 200, and holds the sample cycle 300 high, bypassing the process of feeding the input value 12 to the clock divider 16 and the sample cycle generator 30 and processing the outputs received from the sample cycle generator 30 and the duty-cycle corrector 20.

One of the challenges solved by the present invention was determining when to enable the sample cycle when the value of the integer 52 is changing from one to another number, or from another number to one. The present invention provides a sample cycle output 300 that acts as an enable pulse that is the width of the input clock cycle. When the integer 52 has a value of 1, the sample cycle 300 is asserted high for all cycles of the clocks. When the integer 52 has a value greater than 1, the sample cycle 300 is a divided sample that is asserted one or two cycles prior to the rising edge alignment of the input and output clocks 14, 200 and is driven high for an input clock period. Whether the sample cycle output is asserted one or two input clock 14 cycles prior to the rising edge alignment is dependent upon the actual circuit used in microprocessor.

When the value of the integer 52 is changing to one from another number, three falling edges of the duty-cycle-corrected clock 22 are detected, and that clock enable deasserts. Then, three falling edges of the input clock 12 are detected, the input clock enable asserts, and the value of the input clock 12 is passed through the glitchless clock and sample cycle multiplexer 100, and is output as the value for the output clock 200. When the value of the integer 52 is changing from one to another number, three falling edges of the input clock 12 are detected, and the input clock enable deasserts. Then, three falling edges of the duty-cycle-corrected clock 22 are detected, that clock enable asserts, and the value of the duty-cycle-corrected clock 22 is passed through the glitchless clock and sample cycle multiplexer 100, and is output as the value for the output clock 200. The sample cycle 300 in the present invention is the mechanism for communications between the two synchronous multi-cycled (input and output) clock domains.

The input value 12 from the input clock 14 and the integer 52, are provided to the sample cycle generator 30. The sample cycle generator 30, upon receiving an enable signal, sends an sample cycle signal 32 to the glitchless clock and sample cycle multiplexer 100 that indicates that the input parent clock 14 and output clock 200 are cycle corrected, and data can be transferred between the two clock domains. The sample cycle signal 32 also enables generation of the sample cycle output 300 from the glitchless clock and sample cycle multiplexer 100.

Figure 2:
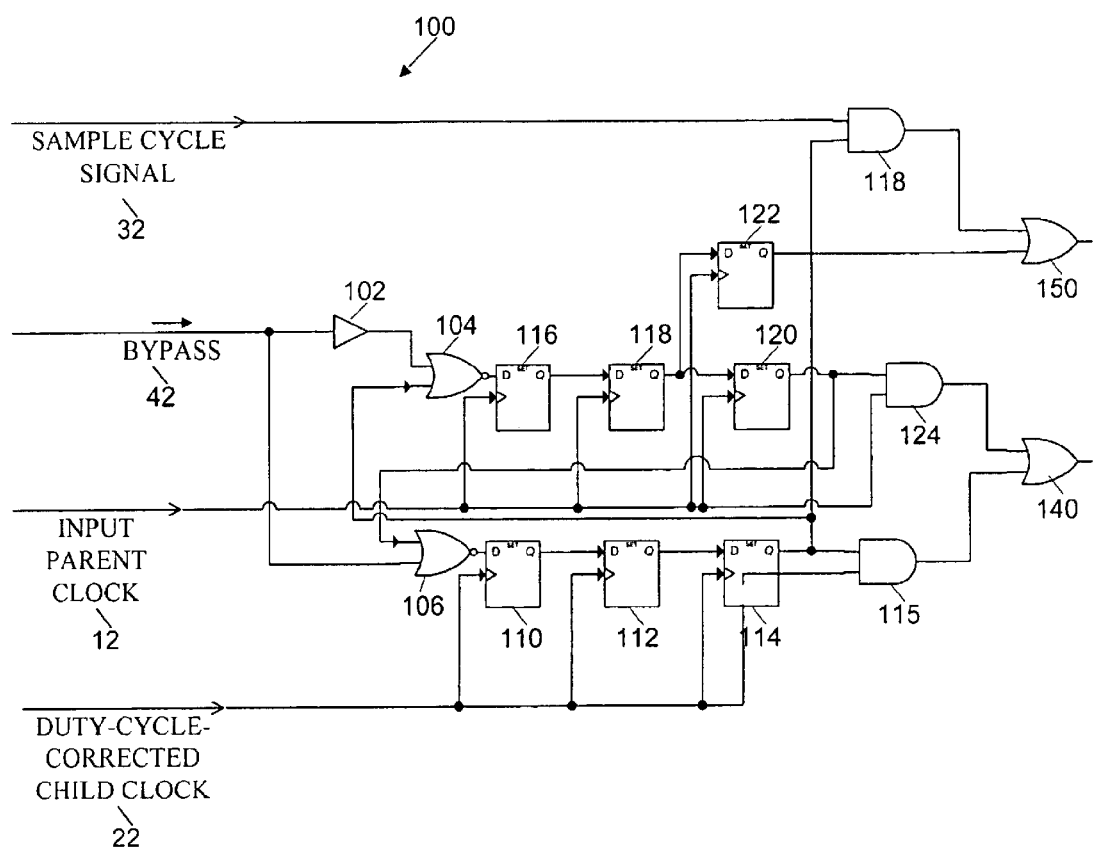
FIG. 2 is a schematic representation of a glitchless clock and sample cycle multiplexer suitable for use in the system of FIG. 1.

The correspondence of the clocks is accomplished in the present invention by unique modifications to the glitchless clock and sample cycle multiplexer 100 suitable for use in the present invention, as shown in FIG. 2. This glitchless clock and sample cycle multiplexer 100 ensures that when the value of the integer 52 changes, that there remains a one-to-one correspondence between the assertion of the sample cycle and the rising edge alignment. When the integer 52 has a value of one, the bypass signal 42 is fed into the first NOR gate 104 through inverter 102 and is also applied directly to the second NOR gate 106. The duty-cycle-corrected generated child clock signal 22 is fed into the clock input of the first, second and third flip flops 110, 112, 114 and fed into one input of the first AND gate 116. The output of the second NOR gate 106 is fed into the D input of the first flip-flop 110. The Q output of the first flip-flop 110 is fed into the D input of the second flip-flop 112. The Q output of the second flip-flop 112 is fed into the D input of the third flip-flop 114. The Q output of the third flip-flop 114 is fed into one input of the second AND gate 118. The Q output of the third flip-flop 114 is fed into the second input of the first NOR gate 104, where the first input to the first NOR gate 104 is inverted bypass signal 42 from inverter 102. The Q output of the third flip-flop 114 is fed into second input of the first AND gate 116, where the first input to the first AND gate 116 is the duty-cycle-corrected generated child clock signal 22.

The parent clock input 12 is fed into the clock input of the fourth, fifth, sixth, and seventh flip flops 116, 116, 120, 122 and is also fed into one input of the third AND gate 124. The output of the first AND gate 115 is one input to the first OR gate 140. The output of the first NOR gate 104 is fed into the D input of the fourth flip-flop 116. The Q output of the fourth flip-flop 116 is fed into the D input of the fifth flip-flop 118. The Q output of the fifth flip flop 118 is fed into the D input of the sixth flip flop 120, and the D input of the seventh flip flop 122. The Q output of the sixth flip-flop 120 is fed into the second input of the third AND gate 124, where the first input of the third AND gate 124 is the parent clock input 12. The Q output of the sixth flip-flop 120 is also fed into the second input of the second NOR gate 106, where the first input to the second NOR gate 106 is bypass signal 42.

The sample cycle signal 32 is the second input of the second AND gate 118, where the first input to the second AND gate 118 is the Q output of the third flip-flop 114. The output of the second AND gate 118 is the first input to the second OR gate 150. The second input to the second OR gate 150 is the Q output from the seventh flip-flop 122. The output of the second OR gate 150 is the sample cycle output 300.

The output of the first AND gate 115 is one input to the first OR gate 140, and the output of the third AND gate 124 is the second input to the first OR gate 140. The output of the first OR gate 140 is the output clock value 200.

Figure 3:
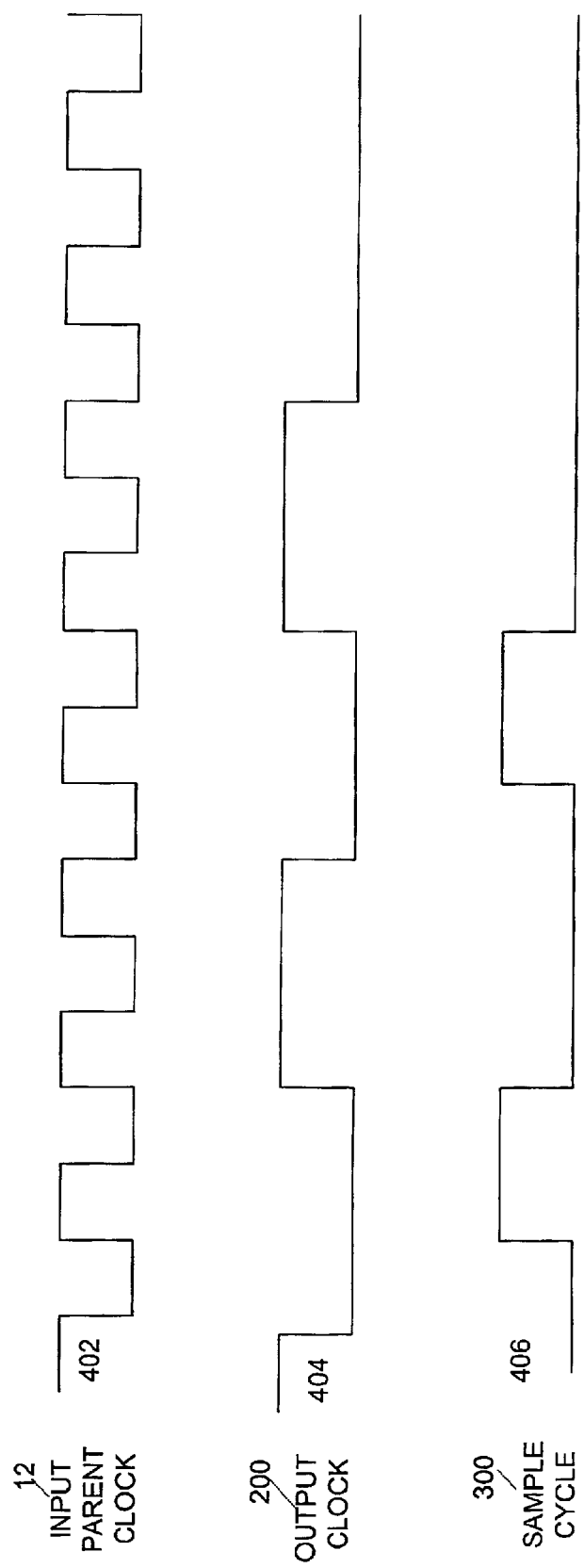
FIG. 3 is a timing diagram illustrating the output clock and sample cycle outputs relative to the input clock while the integer value is being modified.

FIG. 3 illustrates the cycles of the parent input clock 12, the output clock 200 and the sample cycle output 300 over the course of time when the value of the integer 52 is being changed from a value of three to a value of one. As can be seen, the top line 402 traces the cycles of the parent input clock 12, which remains unchanged over time as the value of the integer 52 changes.

The second line 404 traces the cycles of the output clock 200 over time. When the integer 52 has a value of 3, the duty-cycle-corrected clock value 22 is used to generate the output clock value 200. Each duty-cycle-corrected clock cycle 22 corresponds to three input clock 12 cycles. Because the clock value 22 is duty-cycle-corrected there is edge alignment between the input clock 12 and output clock 200 cycles. When the value of the integer 52 is changing from three to one, the comparator sends a bypass signal 42 to the glitchless clock and sample cycle multiplexer 100, indicating to use the value of the input clock 12 as the output clock value 200, and bypass the process of feeding the input value 12 to the clock divider 16 and processing the output received from the duty-cycle corrector 20. After the signal is sent, the glitchless clock and sample cycle multiplexer 100 deasserts the duty-cycle-corrected clock enable after detecting three falling edges of the duty-cycle-corrected clock 22. Then, three falling edges of the input clock 12 must be detected before the input clock enable asserts. At the next rising edge, the value of the input clock 12 is passed through the glitchless clock and sample cycle multiplexer 100, and is used as the value for the output clock 200.

The third line 406 traces the sample cycle output 300 over time. When the integer 52 has a value of three, the sample cycle signal 32 is used to generate the sample cycle output 300. When the integer 52 has a value of three, the sample cycle signal 32 is asserted two cycles prior to the rising edge alignment of the input and output clocks 402, 404 and is driven high for an input clock period. When the value of the integer 52 is changing from three to one, the comparator sends a bypass signal 42 to the glitchless clock and sample cycle multiplexer 100, indicating to deassert the sample cycle output 300, and bypass the process of feeding the sample cycle generator output to the glitchless clock and sample cycle multiplexer 100. This ensures that when the value of the integer 52 changes from three to one, there remains a one-to-one correspondence between the assertion of the sample cycle and the rising edge alignment. When the integer 52 has a value of 1, the sample cycle 300 is asserted for all cycles of the clocks.

Figure 4:
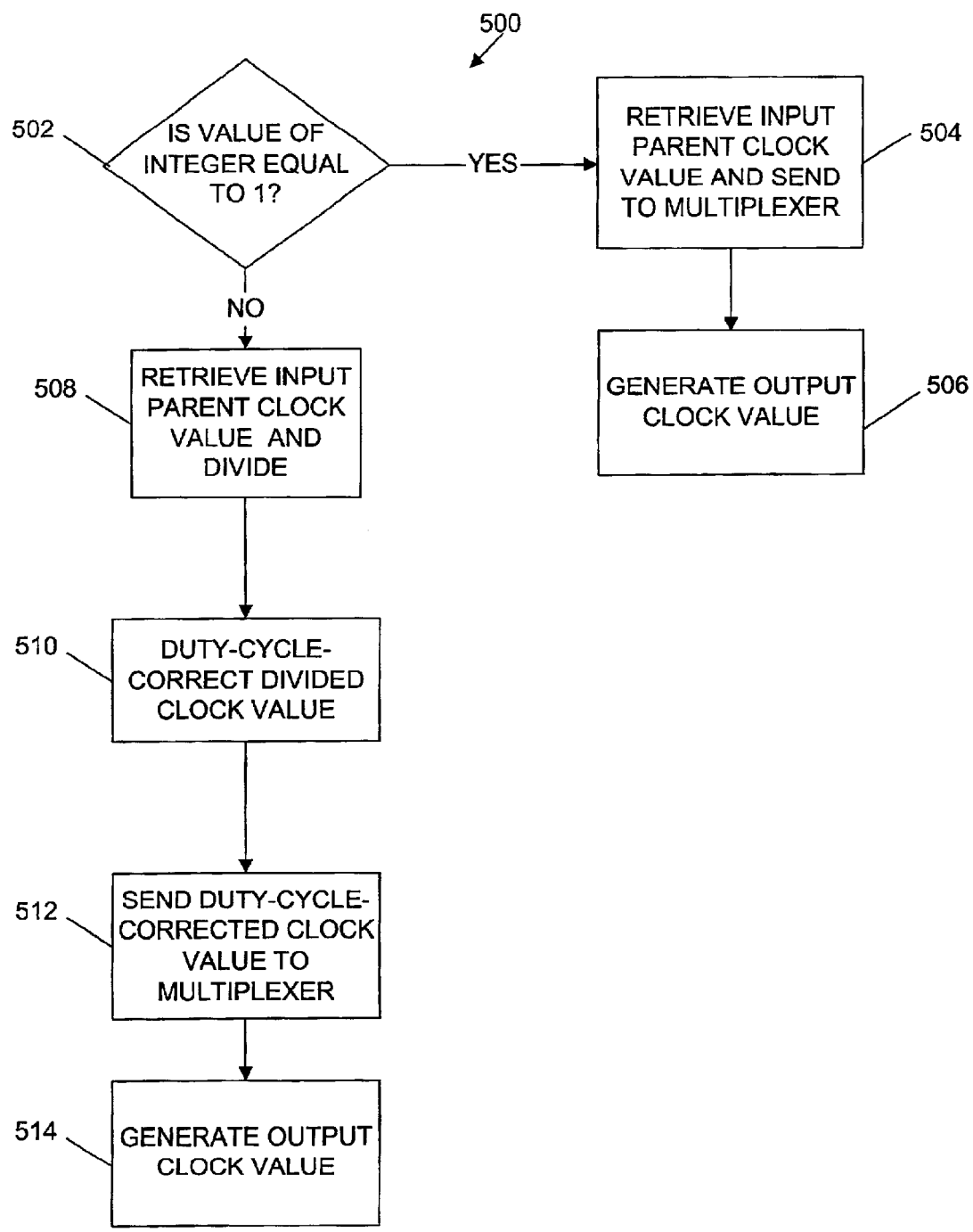
FIG. 4 is a top-level flow diagram of the dynamic clock generation of the present invention.

FIG. 4 shows the process 500 used by the present invention to generate a dynamic clock. In step 502, the microprocessor determines the value of the integer. If the value of the integer is one, in step 504, the microprocessor retrieves the input value from the input parent clock and provides it to the glitchless clock and sample cycle multiplexer for use in generating an output clock value. If the value of the integer in step 502 is greater than one, in step 506, the microprocessor retrieves the input value from the input parent clock and divides it. In step 508, the clock value produced at step 506 is duty-cycle-corrected to have a 50% duty cycle. In step 510, the duty-cycle-corrected clock value is sent the glitchless clock and sample cycle multiplexer. In step 512, the glitchless clock and sample cycle multiplexer on the microprocessor processes the duty-cycle-corrected clock value and in step 514 generates the output clock value.

Figure 5:
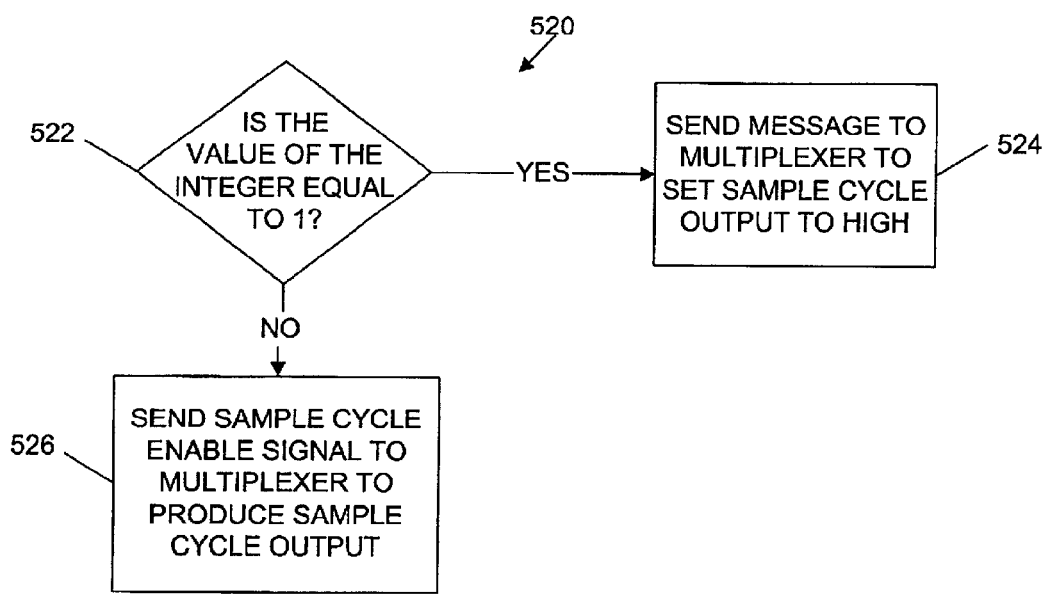
FIG. 5 is a top-level flow diagram of the sample cycle generation of the present invention.

FIG. 5 shows the process 520 used by the present invention to generate a sample cycle output. In step 522, the microprocessor determines the value of the integer. If the value of the integer is one, in step 524, the microprocessor sends a message to the glitchless clock and sample cycle multiplexer to set the sample cycle output value high. If the value of the integer in step 522 is greater than one, in step 526, the microprocessor sends an enable signal to the glitchless clock and sample cycle multiplexer that indicates a sample cycle output 300 can be produced, and that the input parent clock cycle and output clock cycle are cycle corrected, and data can be transferred between the two clock domains.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A dynamically alterable clock comprising:
   means for determining if an integer value generated by a microprocessor has a value of 1;
   if the integer value is 1, means for sending an input parent clock value to a glitchless clock and sample cycle multiplexer for outputting as an output clock value and means for sending a signal to the glitchless clock and sample cycle multiplexer to output a high signal value as a sample cycle output; and
   if the integer value is greater than 1, means for generating a duty-cycle-corrected clock signal from the input parent clock value that has been divided, and sending the duty-cycle-corrected clock signal to the glitchless clock and sample cycle multiplexer for outputting as an output clock value, and means for generating a sample cycle signal, and sending the sample cycle signal to the glitchless clock and sample cycle multiplexer for outputting as a sample cycle value.

2. The clock according to claim 1 wherein the integer value can be changed dynamically during operation.

3. The clock according to claim 1 wherein the integer can have a value between 1 and 32.

4. The clock according to claim 1 wherein the duty-cycle-corrected clock value has a 50% duty cycle.

5. The clock according to claim 1 wherein the sample cycle output is an enable pulse the width of the input parent clock cycle.

6. A dynamically alterable clock with a rising edge alignment enable signal comprising:
   a comparator configured for receiving an integer generated by a microprocessor, determining a value of the integer and sending a bypass signal to a glitchless clock and sample cycle multiplexer if the value of the integer is 1;
   a clock divider configured for receiving an input value from an input parent clock when the value of the integer is not 1, dividing the parent clock input, and outputting a clock divider output value;
   a duty-cycle corrector configured for receiving the clock divider output value and generating a duty-cycle-corrected clock value;
   a sample cycle generator configured for receiving the input parent clock input value when the value of the integer is not 1 and outputting a sample cycle signal; and
   a multiplexer comprising:
      circuitry configured for receiving as inputs the input parent clock value, the duty-cycle-corrected clock value, the sample cycle signal, and the bypass signal;
      circuitry configured for processing the parent clock input when the value of the integer is 1 and outputting an output clock value and a sample cycle output set to a high value; and
      circuitry configured for processing the duty-cycle-corrected child clock input when the value of the integer is not 1 and outputting the output clock value and the sample cycle output.

7. The clock according to claim 6 wherein the integer value can be changed dynamically during operation.

8. The clock according to claim 6 wherein the integer can have a value between 1 and 32.

9. The clock according to claim 6 wherein the duty-cycle-corrected clock value has a 50% duty cycle.

10. The clock according to claim 6 wherein the sample cycle output is an enable pulse having a width of the input parent clock cycle.

11. A glitchless clock and sample cycle multiplexer comprising:
    circuitry configured for continuously receiving as inputs an input parent clock value, a duty-cycle-corrected clock value, a sample cycle signal, and a bypass signal;
    circuitry configured for processing the input parent clock value when the value of the bypass signal is high and outputting an output clock value based on the input parent clock value and a sample cycle output set to a high value; and
    circuitry configured for processing the duty-cycle-corrected clock value and the sample cycle signal when the value of bypass signal is low and outputting an output clock value based on the duty-cycle-corrected clock value and a sample cycle output value based on the sample cycle signal.

12. The multiplexer according to claim 11 wherein the sample cycle output value is an enable pulse the width of the input parent clock.

13. An glitchless clock and sample cycle multiplexer comprising:
    a first NOR gate configured for generating an output clock value, the first NOR gate receiving input from a first AND gate and a second AND gate;
    a second NOR gate configured for generating a sample cycle output, the second NOR gate receiving input from a third AND gate a third series of flip-flops;
    a first series of flip-flops, comprising at least two flip-flops, each driven by a child clock, and configured for receiving an input from an output of the previous flip-flop in the first series, the first flip-flop in the first series receiving an input from a third NOR gate coupled to a bypass input and an output from a last flip-flop in a second series of flip-flops, the output of the last flip-flop in the first series inputting to a first AND gate that receives a second input from the child clock;
    the second series of flip-flops, comprising at least two flip-flops, each driven by a parent clock, and configured for receiving an input from an output of the previous flip-flop in the second series, the first flip-flop in the second series receiving an input from a fourth NOR gate coupled to an inverted bypass input and the output from the last flip-flop in the first series of flip-flops, the output of the last flip-flop in the second series inputting to a second AND gate that receives a second input from the parent clock; and
    at least one flip-flop, driven off the parent clock, and configured for receiving an input from the output of a flip-flop of the second series of flip-flops, the output of the flip-flop inputting to a third NOR gate that receives a second input from the divided sample cycle.

14. A multiplexer for receiving an input parent clock value, a duty-cycle-corrected clock clock, a sample cycle signal, and a bypass signal and outputting an output clock value and a sample cycle value.

15. A method for generating an output clock value and a sample cycle, the method comprising:

receiving an input parent clock value and an integer;

determining if the integer is greater than 1;

if the integer is not greater than 1, sending a bypass signal to a glitchless clock and sample cycle multiplexer and using the input parent clock value as the output clock value and setting the sample cycle to a high state; and if the integer is greater than 1, dividing and duty-cycle correcting the input parent clock value, sending a duty-cycle-corrected output to the glitchless clock and sample cycle multiplexer for use in generating the output clock value, inputting the integer value and the input parent clock value to a sample cycle generator, and sending a sample cycle signal to the glitchless clock and sample cycle multiplexer for use in generating the sample cycle output.

16. The method of claim 15 further comprising dynamically changing the integer value during operation.

17. The method of claim 15 wherein the integer can have a value between 1 and 32.

18. The method of claim 15 wherein the duty-cycle-corrected output has a 50% duty cycle.

19. The method of claim 15 wherein the sample cycle output is an enable pulse the width of the input parent clock cycle.

20. A computer program product for dynamically generating an internal computer clock with a rising edge alignment enable signal, the computer program comprising:

computer program code for calculating an integer value;

computer program code for sending a bypass signal to a glitchless clock and sample cycle multiplexer and using an input parent clock value as an output clock value and setting a sample cycle to a high state if the integer value is 1; and computer program code for dividing and duty-cycle correcting the input parent clock value, sending a duty-cycle-corrected output to the glitchless clock and sample cycle multiplexer for use in generating the output clock value, generating a sample cycle signal and sending the sample cycle signal to the glitchless clock and sample cycle multiplexer for use in generating the sample cycle if the integer value is greater than 1.

* * * * *